June 17, 1930.  J. SEEGMULLER  1,765,247
ELECTRIC MEAT AND LIKE ROASTER
Filed Sept. 12, 1928
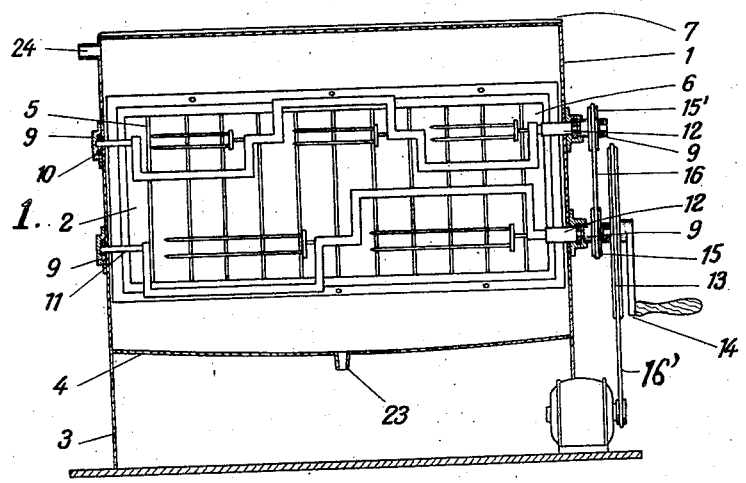
Fig. 1.
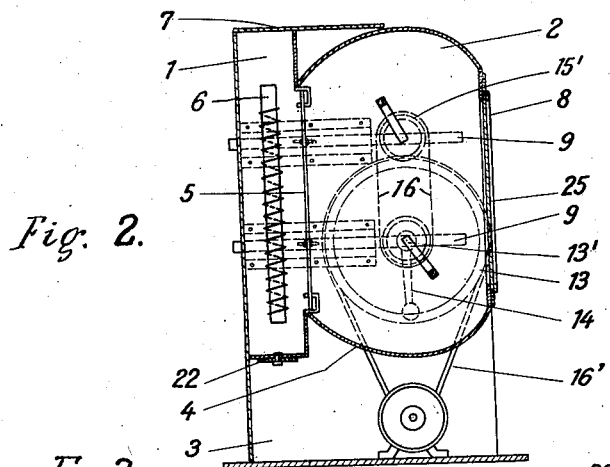
Fig. 2.
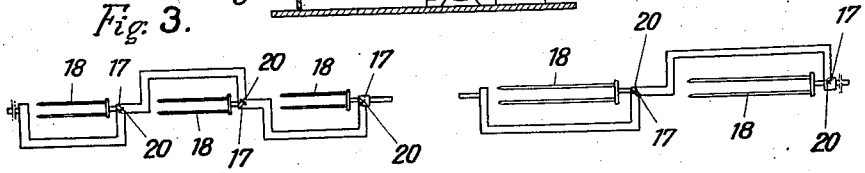
Fig. 3.
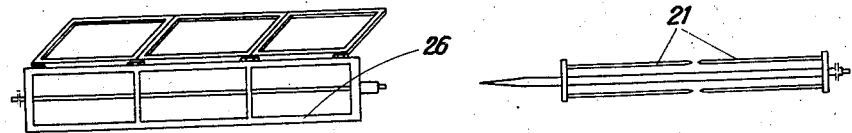
Inventor:
Jules Seegmuller Patented June 17, 1930

1,765,247

UNITED STATES PATENT OFFICE

JULES SEEGMULLER, OF STRASBOURG, FRANCE

ELECTRIC MEAT AND LIKE ROASTER

Application filed September 12, 1928, Serial No. 305,497, and in France September 16, 1927.

This invention relates to an electric meat and like roaster and consists in the provision of a closed chamber containing a vertical grid at one side of which the electric heating elements are arranged while at the other side a plurality of horizontal shafts are mounted which are fitted with carriers for the articles to be roasted and which are connected to driving elements whereby they are rotated together with the articles. The shafts are preferably detachable and may be provided with detachable carriers for instance in the form of roasting spits or forks. Means are provided for the continual discharge of liquid from the roasting chamber and also for regulating the heat by admitting air to the heating elements.

Fig. 1 of the accompanying drawings represents a vertical longitudinal section of the device, Fig. 2, a vertical cross-section of the same, and Fig. 3 shows different forms of shafts and carriers.

The roaster preferably consists of a sheet metal structure which rests by means of vertical walls 3 on a suitable base and which is formed with a closed chamber divided by a vertical grid 5 into two compartments 1 and 2. The compartment 1 contains electric heating elements 6 while the compartment 2 is provided with a plurality of horizontal shafts arranged one above the other and fitted with carriers to which meat and the like can be attached, and whereby it can be turned over in front of the heating elements. The compartment 2 has a concave bottom 4 at the deepest part of which there is an outlet 23 for the continuous discharge of liquid dripping from the articles. The front of the compartment 2 is closed by one or a plurality of hinged doors 8 through which the articles are introduced and removed and through which the necessary basting is carried out.

The doors are fitted with inspection windows through which the roasting process can be watched. A hinged flap 7 which closes the compartment 1 gives access to the heating elements.

The shafts are fitted in bearings which are preferably connected to slides 9 held in horizontal guide-ways so that they can be adjusted for regulating the distance of the shafts from the grid 5. The shafts are preferably detachable so that the articles can be attached to and detached from the same outside the roasting chamber if desired. For this purpose the shafts may be inserted at one end into sockets made in stub axles 12 which are permanently mounted in the bearings and connected to the driving elements. Set screws or the like may be used for securing the shafts to the stub axles. In Fig. 1, where there are two shafts 9 and 11, the stub axles 12 are fitted with grooved pulleys 15 and 15', rotation from one pulley to the other being effected by means of a belt 16. The lower axle has also a large pulley 13 which allows the shafts to be driven by an electric motor through the medium of a belt 16'. The outer end of the lower stub axle may be squared for the reception of a crank handle 14 whereby the apparatus can be operated by hand in case of need.

For the roasting of small articles such as chops and steaks, the shafts may be fitted with carriers in the form of two hingedly connected grids 26 between which the articles are clamped, one of the grids being secured to the shaft. For larger articles such as fowls and the like the shafts may be cranked and adapted to hold a roasting spit or fork 18 in the center of rotation. The shafts may have bores or sockets 17 adapted to receive the tangs of the forks and set screws 20 whereby the forks are secured in position. The cranks and forks may, as shown in Fig. 3, be more or less numerous according to the size of the articles. In the case of very large pieces of meat, two forks 21 may be used fitted with opposing prongs.

The apparatus can be worked continuously, since it is easy to watch the roasting process and to exchange each article for a fresh one as soon as it is finished.

There is an air vent 24 at the upper part of the compartment 1, and air can be admitted through an adjustable ventilator 22 at the bottom of the compartment for regulating the heat according to requirements.

I claim:

1. A meat and like roaster comprising a closed chamber, a vertical grid in said chamber, electric heating elements arranged at one side of said grid, a plurality of horizontal shafts mounted rotatably at the other side of the grid, carriers on said shafts for the articles to be roasted, and driving elements for imparting rotation to said shafts and carriers, the chamber being formed with an air vent situated above and with a regulable air inlet situated below the heating elements.

2. A meat and like roaster as claimed in claim 1 wherein the shafts are cranked and formed at each crank with a socket, and wherein the meat or like carriers are composed of roasting spits adapted to be secured in said sockets and to be held thereby in the center of rotation.

3. The structure claimed in claim 1 in combination with bearings for the shafts, and horizontally adjustable slides carrying said bearings so as to allow the positions of the shafts to be varied relative to the grid.

4. The structure claimed in claim 1 in combination with stub axles connected permanently to the driving elements and adapted for detachable connection to the roasting shafts.

5. A meat and like roaster as claimed in claim 1 wherein the chamber is provided with inspection windows.

JULES SEEGMULLER.